US011644364B1

(12) United States Patent
Moore (10) Patent No.: US 11,644,364 B1
(45) Date of Patent: May 9, 2023

(54) HIGH TEMPERATURE THERMAL SENSORS

(71) Applicant: Louisiana Tech Research Corporation, Ruston, LA (US)

(72) Inventor: Arden Moore, Ruston, LA (US)

(73) Assignee: Louisiana Tech Research Corporation, Ruston, LA (US)

( * ) Notice: Subject to any disclaimer, the term of this patent is extended or adjusted under 35 U.S.C. 154(b) by 864 days.

(21) Appl. No.: 16/515,857

(22) Filed: Jul. 18, 2019

(51) Int. Cl.
*G01J 5/14* (2006.01)
*G01J 5/04* (2006.01)
*G01J 5/02* (2022.01)
(52) U.S. Cl.
CPC .............. *G01J 5/14* (2013.01); *G01J 5/0205* (2013.01); *G01J 5/046* (2013.01)
(58) Field of Classification Search
CPC ............. G01J 5/14; G01J 5/0205; G01J 5/046
See application file for complete search history.

(56) References Cited

U.S. PATENT DOCUMENTS

2015/0207052 A1* 7/2015 Carr ...................... G01L 27/005
73/1.57

OTHER PUBLICATIONS

Martin, L. C., Wrbanek, J. D., & Fralick, G. C. (Aug. 2001). Thin film sensors for surface measurements (pp. 196-203) IEEE.

Wilson, Scott, et al. "Fabrication and testing of a thin-film heat flux sensor for a stirling convertor." 7th International Energy Conversion Engineering Conference. 2009.
Wrbanek, John D., et al. "Ceramic thin film thermocouples for SiC-based ceramic matrix composites." Thin Solid Films (2012).
Wrbanek, John, et al. "Thin Film Heat Flux Sensor Development for Ceramic Matrix Composite (CMC) Systems." 45th AIAA/ASME/SAE/ASEE Joint Propulsion Conference & Exhibit. 2010.
Khatri, Nishan, et al. "A batch fabrication-compatible multifunctional thermal sensor based on thin film thermocouple and thermopile elements." Sensors and Actuators A: Physical 280 (2018): 188-196.

* cited by examiner

*Primary Examiner* — Kiho Kim
(74) *Attorney, Agent, or Firm* — Jones Walker LLP (57) ABSTRACT

A thermopile sensor including a uniform substrate having a first surface with a first section and a second section at an elevation varying relative to the first section by between about 5 micrometers and about 500 micrometers. The sensor further includes a plurality of thermopile junctions, with each junction having (i) a first strip of a first conductive material, extending from the first section to the second section, (ii) a second strip of a second conductive material, forming an electrical junction with the first strip on the second section and extending to the first section, and (iii) with the thermopile junctions being connected in series. A first contact pad on the substrate is connected to an initial thermopile junction and a second contact pad on the substrate is connected to a last thermopile junction, with conductors connecting to the first and second contact pads and extending off of the substrate.

21 Claims, 3 Drawing Sheets

HIGH TEMPERATURE THERMAL SENSORS

STATEMENT REGARDING FEDERALLY SPONSORED RESEARCH OR DEVELOPMENT

This invention was made with government support under Cooperating Agreement Number NNS16AA17A awarded by NASA John C. Stennis Space Center. The government may have certain rights in the invention.

BACKGROUND

Accurate measurements of temperature, heat flux, and thermal gradients within high temperature environments are essential to a wide variety of applications such as rocket engines, gas turbines, and down-well drilling operations. Such data allows for health monitoring, failure analysis, and performance optimization of components under test and critical infrastructure elements. From this information, engineers may gain insights that influence near-term operational decisions, inform design refinement, and guide long-term developmental priorities. Existing instrumentation options such as thermocouples, resistance temperature detectors, thermistors, and noncontact optical methods are mature and established within the thermal transport community. However, the harsh environments and high temperatures associated with the applications listed above are not always suitable for the vast majority of these instrumentation options. Small, inexpensive temperature sensors which can operate reliably in a high temperature environment would be a significant advance in the field.

BRIEF SUMMARY OF SELECTED EMBODIMENTS

One embodiment of the invention is a thermopile sensor which includes a uniform substrate having a first surface with a first section and a second section at an elevation varying relative to the first section by between about 5 micrometers and about 500 micrometers. The sensor further includes a plurality of thermopile junctions, with each junction having (i) a first strip of a first conductive material, extending from the first section to the second section, (ii) a second strip of a second conductive material, forming an electrical junction with the first strip on the second section and extending to the first section, and (iii) with the thermopile junctions being connected in series. A first contact pad on the substrate is connected to an initial thermopile junction and a second contact pad on the substrate is connected to a last thermopile junction, with conductors connecting to the first and second contact pads and extending off of the substrate.

Another embodiment is a thermal sensor which includes a thermopile component substantially as described above. However, the thermal sensor also includes a thermocouple component having (i) a third strip of a third conductive material connecting with a fourth strip of a fourth conductive material on the first surface of the substrate to form an electrical junction; (ii) a third contact pad on the first surface connecting to the third strip and a fourth contact pad on the first surface connecting to the fourth strip; and (iii) wherein the third and fourth strips do not intersect the first or second strips.

DETAILED DESCRIPTION OF SELECTED EMBODIMENTS

Figure 1:
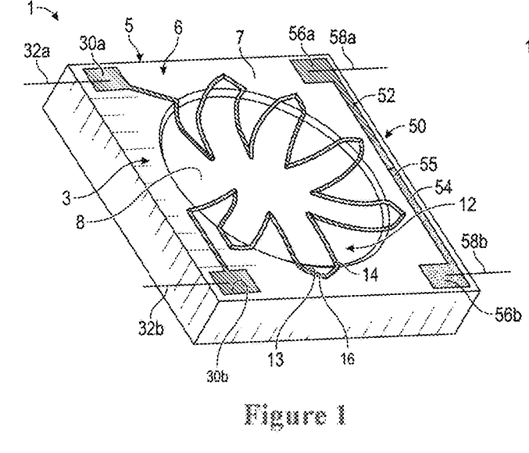
FIG. 1 illustrates one embodiment of the temperature sensor of the present invention.
Figure 2:
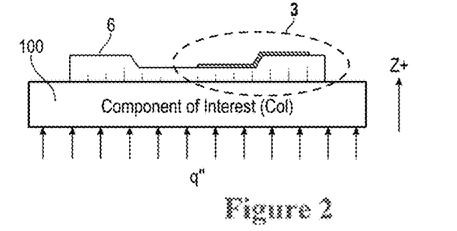
FIG. 2 illustrates is a side view of the FIG. 1 embodiment position on a component whose temperature is being measured.
Figure 3:
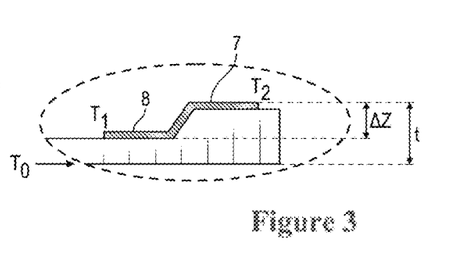
FIG. 3 illustrates is an enlarged side view of the FIG. 1 embodiment.

One embodiment of the present invention is seen in FIGS. 1 to 3. The temperature sensor 1 seen in FIG. 1 most generally consists of thermopile sensor 3 formed on a substrate 5 and a thermocouple sensor 50 formed on the substrate 5. Turning first to the thermopile sensor (also referred to as the "thermopile component") 3, the thermopile component 3 is formed on a first surface 6 of substrate 5. Typically, the first surface 6 will be the "upper" surface of the substrate 5, i.e., the surface facing away from the equipment surface 100 on which temperature sensor 1 is positioned as suggest in FIG. 2. This first surface 6 is shown in FIG. 1 as having a first section 7 and a second section 8. The first and second sections 7 and 8 will have different "heights" or "elevations." For example, as shown in FIG. 3, first section 7 is positioned atop a thicker portion of the substrate 5 than is second section 8, thus first section 7 is at a higher "elevation" than second section 8 relative to the equipment surface 100. In many embodiments, this difference in elevation between first section 7 and second section 8 will be between about 5 micrometers and about 500 micrometers (or any sub-range thereof). In FIG. 1, this difference in elevation is reflected as second section 8 forming a depression or "pit" in the substrate surface. The depression of second section 8 can be created by any conventional or future developed method of etching substrate materials, such as wet chemical etching techniques, dry etching techniques, plasma-assisted etching techniques, or a physical sputtering technique (i.e., by building up the surrounding first section 7). In many embodiments, the first surface 6 of the substrate has an area of between about 2 mm$^2$ and about 25 mm$^2$, but other embodiments could have a first surface area outside this range. Similarly, the thickness "t" of the substrate as suggested in FIG. 3 may be about 1 mm in certain embodiments, but could be less or more than 1 mm (e.g., 0.1 to 5 mm or any subrange thereof) in other embodiments.

The substrate 5 in the illustrated embodiments is a "uniform substrate" section, meaning it is a substrate formed of a generally continuous and homogeneous structure. The substrate is homogeneous in the sense that a sample taken from any area of the substrate will have the same characteristics as a sample taken from another area. The substrate is continuous in the sense that it is formed from a monolithic structure as opposed to separate parts joined together. In general, the substrate will be formed of a material having a comparatively high melting point (e.g., over 1000° C.) and is substantially electrically insulating, at least in comparison to the refractory metal discussed below. In many embodiments, the substrate has a resistivity above about $10^{12}$ ohm-cm. Example materials for substrate 5 could include sapphire or silicon carbide.

FIG. 1 also illustrates how a series of thermopile junctions 12 will be formed across the first section 7 and second section 8 of first surface 6. Each thermopile junction 12 will be formed of a first strip of a first conductive material 13 and a second strip of a second conductive material 14 which meet to form an electrical junction 16. In FIG. 1, a plurality of thermopile junctions 12 are connected one to another in series. Preferably, the conductive material will have a melting point of at least 1000° C. and may include refractory metals such as Ti, V, Cr, Mn, Zr, Nb, Mo, Tc, Ru, Rh, Hf, Ta, W, Re, Os, Jr, and alloys thereof. An "alloy" of a refractory metal is any metal combination which is at least 51% by weight of that refractory metal. The other 49% or less of the alloy can be any compound or substance (i.e., not only other metals) which provides a desired property to the alloy. The first and second strips could also be formed of alloys of non-refractory metals if those alloys exhibit a sufficiently high melting point. Where the first conductive strip is one refractory metal, the second conductive strip will be a different refractory metal in order to create an electrical junction where the strips meet. In many embodiments, it is also preferable that the coefficient of thermal expansion (COE) of the substrate is within 30% (or less preferably, within any percentage less than 50%) of the COE of the first and second strips of conductive material.

In the FIG. 1 embodiment, the second section 8 of the substrate is a circular depression with the first section 7 of the substrate being the elevated area outside the depression. Each thermopile junction 12 is formed by the first conductive strip 13 extending from second section 8 to first section 7, and then a second conductive strip 14 joining first conductive strip 13 and extending back into second section 8. A second thermopile junction 12 is joined to the first and the first/second conductive strip arrangement is repeated. FIG. 1 shows six thermopile junctions 12 connected in series around the perimeter of the circular depression (substrate second section 8), but any number of thermopile junctions would be used depending on space available (e.g., any number between 1 and 15 of thermopile junctions). As explained in more detailed below, typically the greater the number of thermopile junctions, the greater the output signal.

In many embodiments, the first and second strips have a thickness (i.e., depth of deposition) of any value between about 20 and about 500 nm and a width of any value between about 20 nm and about 250 um. The first and second conductive strips may be applied to the substrate by any suitable conventional or future developed technique for depositing thin metallic films onto a substrate, including as non-limiting examples, sputter deposition, thermal evaporation, electron beam evaporation, or screen printing of particles.

Although the figures illustrate the elevation difference between substrate section 7 and 8 being formed by a depression etched in the center of the substrate, this need not be the case in all embodiments. As an alternative example, the elevation difference could be achieved by etching the outer portion of the substrate in order to leave an elevated "mound" in the substrate center. Those skilled in the art will comprehend many other designs which can implement the elevation difference required for sensing heat flux.

FIG. 1 also illustrates how a first contact pad 30a on the substrate 5 is connected to the initial thermopile junction 12 and a second contact pad 30b is connected to a last thermopile junction 12. Typically, the contact pads 30a and 30b are formed of the same refractory metal as is the thermopile strip 12 or 13 to which the contact pads connect and are deposited in the same manner as the thermopile strips. In certain embodiments, each contact pad has an area of between about 0.25 mm$^2$ and about 2.5 mm$^2$. Conductors 32 are connected to and extend from the first and second contact pads in order to establish a connection with voltage sensing equipment (not illustrated). Preferably, the conductors are formed from materials that do not oxidize at high temperatures, such as Au, Ag, Pt, or alloys thereof. The conductors are normally welded to the contact pads by methods such as by resistance welding, energy beam welding, or solid-state welding, but other suitable attachment techniques are possible.

In the FIG. 1 embodiment, first surface 6 of substrate 5 further includes a thermocouple component or sensor 50. Thermocouple component 50 is formed of a third strip 52 of conductive material connecting with a fourth strip 54 of conductive material creating the electrical junction 55. Third conductive strip 52 is formed with the third contact pad 56a and fourth conductive strip 54 is connected to fourth contact pad 56b. For ease of manufacture, third strip 52 and fourth strip 54 (and their contact pads) may be formed of the same refractory metals as thermopile first strip 13 and second strip 14, respectively. It is seen in FIG. 1 that the thermopile conductive strips 12 and 13 do not intersection the thermocouple conductive strips 52 and 54. Conductors 58 extend from contact pads 56 and are welded to contact pads in the same manner as described above in relation to conductors 32.

Additionally, in many embodiments, after deposition of the thermopile structures, thermocouple structures, and contact pads, an anti-oxidation layer is applied over the first surface 6 (excepting the contact pads) of substrate 5. Non-limiting examples of this anti-oxidation layer may include MgO, SiO2, Al2O3, or another similar electrically insulating material with melting point above that of the intended application. Common example thicknesses of the anti-oxidation layer are between about 10 nm and about 500 nm nanometers (or any subrange in between).

It will be understood that the thermocouple feature will provide a voltage response to temperature changes while the thermopile junctions will provide a voltage increase in response heat flux normal to the sensor substrate. During operation, the thermocouple generates an open-circuit voltage through the Seebeck effect. This voltage is proportional to the temperature at the material junction relative to a secondary reference condition. For a single-pair thermocouple junction, the open-circuit voltage is measured directly and the reference condition is provided externally through either comparison against a separate reference junction at known temperature or via a reference junction compensation approach implemented in the accompanying data acquisition (DAQ) hardware/software.

Heat flux sensing is accomplished using the thermopile pattern (multiple thermocouples arranged in series) which spans two regions of differing substrate thickness. In this configuration, the voltage output from the thermopile is proportional to the temperature difference ΔT between the two regions on the substrate, with zero voltage output in the case of a uniform temperature (i.e. no heat flux) and the heat flux vs. voltage relationship for the thermopile determined via calibration. As illustrated in FIG. 2, for a heat flux perpendicular to the sensor's bottom surface, the difference in substrate thickness produces a difference in temperature that is measured by the thermopile. With the thermal conductivity (κ) of the substrate material known, the heat flux (q″) normal to the surface-mounted sensor can be determined via a finite difference approximation of Fourier's Law:

$$q'' = -\kappa \frac{\Delta T}{\Delta z} \quad \text{Equ. 1}$$

where $\Delta z$ is the thickness difference across which the temperature difference $\Delta T$ is measured. Note that the sign convention relates the measured temperature drop ($\Delta T=T_2-T_1$) with a heat flux applied in the positive z direction as shown in FIG. 2. For a heat flux moving in the opposite direction, the sign of the measured $\Delta T$ is reversed and, as a result, q″ has opposite sign as well. Thus, so long as the sign convention is kept consistent the sensor is capable of measuring both heat flux magnitude and direction. Finally, when the surface temperature measured by the single-pair thermocouple on the sensor's top surface is combined with the heat flux value from the thermopile, the temperature at the interface of the sensor and the component of interest can be found via extrapolation of the temperature gradient:

$$T_0 = T_2 + \frac{q''t}{\kappa} \quad \text{Equ. 2}$$

where t is the total thickness of the sensor. Both Equations 1 and 2 are based on the assumption of 1D steady state heat transfer across the thickness of the sensor. The validity of this assumption was evaluated via finite element analysis (FEA) simulation using the COMSOL Multiphysics simulation software in conjunction with experimental data obtained via testing of sensor prototypes.

Several factors determine the voltage output of the thermopiles in response to a change in heat flux. As suggested above, the difference in height between first section 7 and the second section 8 is one factor. A second factor is the thermal conductivity of the substrate, with a lower thermal conductivity resulting in an increased voltage output for equivalent applied heat flux. A third factor is the Seebeck coefficients of the two constituent refractory metals. A fourth factor is the number of thermopile junctions placed in series. In one embodiment, the plurality of thermopile junctions position in series will have a voltage output of at least 5 mV at 700° C.

Experimental Example

One experimental example of the sensor design took the form of the device shown in FIGS. 1-3. The dimensions of an individual sensor are 5 mm×5 mm×0.9 mm. Fundamentally, the sensor consists of microfabricated thin film thermocouples and thermopiles of select refractory metals integrated onto a high-temperature ceramic substrate. A thin oxide layer provides protection and insulation for the sensing elements from mechanical abrasion or environmental exposure. The use of thin film thermocouples/thermopiles and microfabrication methods allow the sensor to remain macroscopically planar and with total thickness below 1 mm. This in turn facilitates minimally invasive surface mounting of the sensor onto various components of interest. Further, microfabrication allows the sensors to be batch fabricated and minimize cost; for example, using the design presented in this work, a standard four-inch diameter wafer of high-temperature substrate produced over 160 individual sensors. Thermocouple/thermopile sensing is chosen due to its simplicity as well as its passive nature, i.e. its voltage output is self-generated and the sensor does not require a power input as RTDs or thermistors do. The thin film thermocouple/thermopile features are 85-100 μm in width and 100 nm thick, while the topmost protective oxide has thickness of 150 nm.

During operation, the thermocouple generates an open-circuit voltage through the Seebeck effect. This voltage is proportional to the temperature at the material junction relative to a secondary reference condition. For the single-pair thermocouple junction, the open-circuit voltage is measured directly and the reference condition is provided externally through either comparison against a separate reference junction at known temperature or via a reference junction compensation approach implemented in the accompanying data acquisition (DAQ) hardware/software. The latter of these is an accepted and commonly used practice in almost all modern thermocouple DAQ setups and is likewise utilized here. In this way, the measured open-circuit voltage from the single-pair thermocouple on the sensor can be converted to a temperature reading with proper calibration of voltage output against a known temperature beforehand. Heat flux sensing is accomplished using the thermopile pattern (multiple thermocouples arranged in series) which spans two regions of differing substrate thickness. In this configuration, the voltage output from the thermopile is proportional to the temperature difference $\Delta T$ between the two regions on the substrate, with zero voltage output in the case of a uniform temperature (i.e. no heat flux) and the heat flux vs. voltage relationship for the thermopile determined via calibration.

The present design implements a circular "etch pit" which is etched down into the native substrate, which then forms an interface-free condition across the step such that delamination or expansion stresses are reduce. It also allows for a much larger step-height than can typically be achieved via conventional thin film deposition techniques. Besides a high melting point ($T_m$), candidate materials' coefficient of thermal expansion (CTE) must also be considered to avoid cracking or delamination of the sensor due to thermal stress. For these reasons, the substrate material targeted for this work was semiconductor-grade sapphire ($\alpha$-$Al_2O_3$, $T_m$=2050° C., CTE=5-6.6×$10^{-6°}$ $C.^{-1}$) which is cost effective in its synthetic wafer form. The use of silicon carbide (SiC, $T_m$=2730° C., CTE=4.0×$10^{-6°}$ $C.^{-1}$) was also considered. However, SiC is ~5×-7× more expensive than sapphire. Refractory metals tungsten (W, $T_m$=3422° C., CTE=4.5×$10^{-6°}$ $C.^{-1}$) and molybdenum (Mo, $T_m$=2623° C., CTE=4.8×$10^{-6°}$ $C.^{-1}$) were utilized for the thin film thermocouple/thermopile components. These materials possess comparable CTE to the sapphire substrate and one another. To prevent oxidation or surface damage to the metallic features, a thin protective layer of magnesium oxide (MgO, $T_m$=2852° C., CTE=8×$10^{-6°}$ $C.^{-1}$) was chosen to be sputter-coated onto the top of the device after definition of the refractory metal features and attachment of contact leads.

Commercially obtained single-side polished semiconductor-grade sapphire wafers 100 mm in diameter and 900 μm thick served as the starting substrate. In order to first realize the thinner circular region (i.e. the "etch pit") in the center of the sensor as shown in FIG. 1, a patterning process consisting of standard UV photolithography and wet chemical etching was developed. Since the wet etchant needed to etch the chemically resilient sapphire substrate consisted of a mixture of sulphuric ($H_2SO_4$) and phosphoric ($H_3PO_4$) acids, a polymeric photoresist was unsuitable for patterning the sapphire directly. Instead, a 300 nm-thick $SiO_2$ layer was first deposited onto the surface of the sapphire using plasma-enhanced chemical vapor deposition (PECVD) and patterned using photolithography to serve as a so-called "hard mask" for the subsequent wet chemical etching of the sapphire substrate. After developing the initial photoresist mask, the exposed circular regions of the $SiO_2$ layer were selectively wet etched using a dilute hydrofluoric (HF) acid solution. The solution used for the etching of the sample was 50:1 $H_2O$:HF (40-45%), which gave approximately 20 nanometer per minute (nm/min) etch rate at room temperature. The etching process was divided into multiple short sessions because of the need to confirm that the underlying sapphire had been exposed without over-etching the $SiO_2$. Once the underlying sapphire within the circular features was exposed, the $SiO_2$ hard mask was complete and wet chemical etching of the sapphire itself could proceed.

To perform the wet etching of the sapphire substrate and form the circular "etch pit", a heated solution of $H_2SO_4$ and $H_3PO_4$ was used. However, the etch rate for wet chemical etching using equal parts of sulphuric and phosphoric acid (1:1 $H_2SO_4$:$H_3PO_4$) solution as is commonly specified in literature was found to be unacceptably slow at approximately 0.3 nm/min. As a result, a modified wet chemical etching procedure was developed using three parts sulphuric acid to one part of phosphoric acid (3:1 $H_2SO_4$:$H_3PO_4$) solution at 160° C. similar to that introduced in D. W. Kim, C. H. Jeong, K. N. Kim, H. Y. Lee, H. S. Kim, and G. Y. Yeom, "Dry etching of sapphire substrate for device separation in chlorine based inductively coupled plasmas," *Materials Science and Engineering B*, vol. 42, pp. 795-799, 2002 (incorporated by reference herein). Etch rates of 5-10 nm/min were achieved and a total etch pit depth of 60-70 μm was realized for the fabricated thermal sensors as measured using profilometer and 3D laser microscopy. With the patterning of the central circular "etch pit" complete, the $SiO_2$ oxide hard mask was removed by immersing the wafers completely in a 50:1 50:1 $H_2O$:HF solution for five minutes. The bare sapphire substrate with defined etch pit features was now ready for deposition of the thin film metal thermocouple and thermopile elements. As mentioned previously, the use of thin film thermocouples/thermopiles and microfabrication methods have specific benefits related to functionality, performance, and cost. Specifically, it facilitates the creation of a minimally-invasive, batch fabrication-compatible sensor with small thermal mass/fast response time.

Because of the relatively large depth of the etched pit on the wafer surface, patterning of the metal features via conventional photolithography was deemed to be problematic due to the uneven resist thickness that would result from spin coating. Instead, sputter metallization through a stainless steel "shadow mask" in contact with the wafer was employed. Two different shadow masks were used, one for each of the respective metals. First, the shadow mask for W was aligned to the etch pit features on the patterned sapphire substrate using a light microscope and held in place using small regions of cured photoresist. After deposition of the W was complete via sputtering with a W target, its shadow mask was detached from the substrate and the shadow mask for Mo was similarly aligned and secured prior to sputtering with a Mo target. The metallization processes were done using a Cressington 208 HR Metal Sputter Coater under ~$10^4$ mb absolute pressure. Deposition of W was performed at 80 mA current which gave a deposition rate of 1.5 nm/min. For the lower density Mo, deposition was performed at 60 mA which resulted in a deposition rate of 3 nm/min. Both W and Mo were deposited to 100 nm thickness relative to the sapphire substrate.

Following metallization, individual devices were isolated from the wafer by using an automated dicing saw to create score lines for controlled fracture. In this way, rows or groups of devices could be easily removed from the parent wafer. An additional annealing step at 650° C. under hydrogen flow was then performed to improve sputtered film quality, enhance junctions, and remove any surface oxides formed during sputtering which can hinder electrical contact. The resulting W/Mo junctions both at the outer edge and inner central area of the etch pit on a single device were visible in the light microscope. A 3D laser microscope was used to visualize and measure the depth of the etch pit, where portions of the thin film metal features are also visible.

High temperature tests were performed using a Lindberg/Blue M Mini-Mite quartz tube furnace with ends open to air. The sensor under test was mounted onto a 7 mm×7 mm square of amorphous alumina using type 8884 fritless gold paste high temperature conductor from ESL Electrosciences (firing temperature of 950-980° C. via vendor) to form a good thermal contact. A small coil of Nichrome heating wire was attached to the backside of the alumina square using OMEGABOND 400 high temperature cement, thus creating a controllable heating stage for the sensor. It should be noted that sensor itself only consists the sapphire substrate, thin film metal deposits, and protective oxide layer and that this is the element that would be surface-mounted to a component under test in actual usage. The alumina stage is only used as a test stage for laboratory development to facilitate the implementation of the Nichrome backside heater during thermopile testing. The high temperature gold paste was also used as a bonding element to attach gold lead wires to the sensor's contact pads. Here, gold is used for its oxidation resistance and its standard use in thermocouple/thermopile testing. Similarly, gold wires were also used as leads from the voltage source to the Nichrome wire heater. Finally, after the gold lead wires had been attached, 150 nm of protective MgO was sputtered onto the top surface of the sensor. This was done post-lead attach to allow reliable contact to be formed to the metallic contact pads first.

For thermocouple testing, the Nichrome wire heater was not powered. For heat flux sensor testing, a constant voltage was applied from a precision DC power supply via gold leads and the resulting current measured. Given their large differences in electrical resistance, voltage drop along the gold leads was found to be negligible compared to that across the Nichrome heater. Thus the total heat being dissipated by the backside Nichrome heater is taken to be the applied voltage multiplied by the measured current. All surfaces of the sample stage except for the top surface of the sensor were covered by high temperature alumina-silica insulation, which is a pliable solid similar in texture to conventional fiberglass insulation. Simple conduction heat transfer analysis of heat loss through the insulation and along the thin gold leads showed these values to be at least an order of magnitude smaller than the Nichrome heater power. Thus, we take the heat flux applied to the backside of the sensor to reasonably approximated at the voltage-current product divided by the exposed topside area of the sensor, i.e. its cross-section.

Upon exiting the tube furnace, the gold lead wires for the thermocouple and thermopile elements were connected to gold-plated BNC connections, which in turn interfaced with a pair of low noise voltage preamplifiers (Stanford Research Systems SR560, one each for the thermocouple and thermopile lead pairs). It is through these preamplifiers that filtering and amplification of the raw signal was accomplished. Amplifier output was sampled every 1 second by a LabView-controlled National Instruments PCIe-6321 X-Series DAQ module, with a National Instruments BNC-2090A BNC board acting as the intermediary between the module and the voltage preamplifiers. The ambient temperature is controlled by having the terminal connections mounted onto a common block of material with significant thermal mass, which itself is located within a climate-controlled room. The DAQ system's temperature is maintained in a similar manner. The furnace has its own closed-loop temperature control system, in which a thermocouple in contact with the quartz tube is the input to the controller and the heating power is adjusted automatically to maintain the constant set temperature within the heating zone.

Sensors from the finished wafer were tested within the high temperature tube furnace setup described above, with representative results shown in FIGS. 4-6. A total of three sensors were tested, all with similar results. The first two sensors continued to have strong signal output up to 1000° C., but some degradation of thermocouple signal magnitude was observed beyond 800° C. for prolonged testing times. It is possible that a thicker MgO coating could provide superior protection in future work. Another possibility is that the gold paste used for lead attach—while having a firing temperature listed as being 950-980° C. via vendor information—is not well suited to sustained high temperatures. Future sensors could utilize an alternative lead attach method such as micro-welding to avoid this potential issue.

Figure 4:
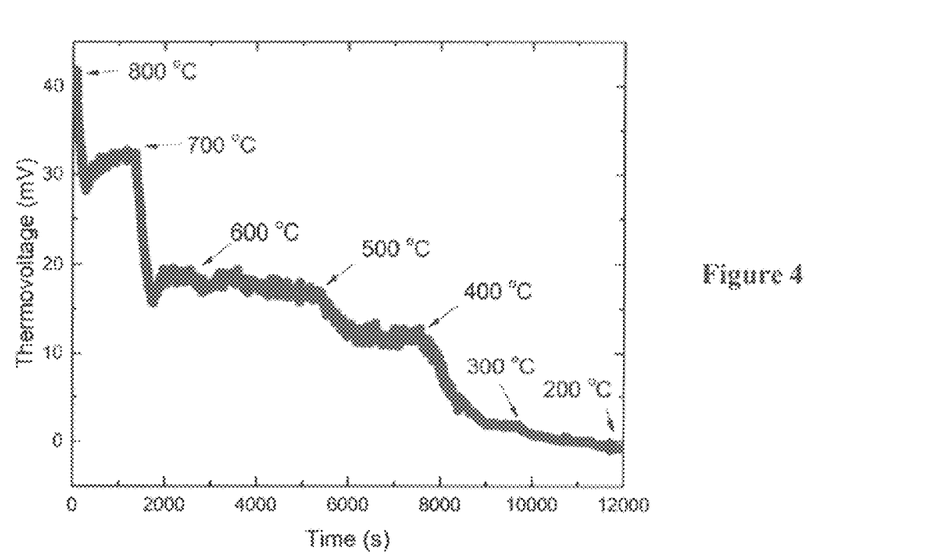
FIG. 4 illustrates thermocouple voltage output from a temperature increase over time.
Figure 5:
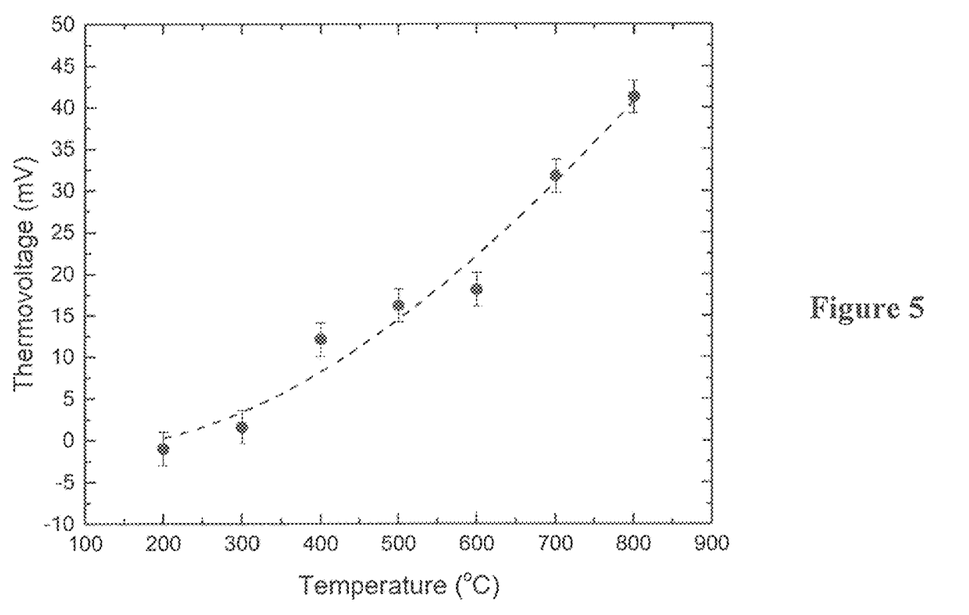
FIG. 5 illustrates thermocouple voltage output from a temperature increases.

Next, a high temperature/long duration functionality test was performed on the third sensor in order to ascertain the longevity of a second sensor in an air environment. This test was eventually ended after ten consecutive hours of the sensor providing consistent signal output while being maintained at a constant furnace temperature 800° C. FIG. 4 shows the output from the thermocouple element from this sensor as the temperature was subsequently stepped down in 100° C. increments after the longevity test. Note that the time to reach steady-state is not necessarily indicative of the sensor's time response alone but also of the time required for the tube furnace to cool down at each step. Since the actual measurand was the thermovoltage output rather than temperature itself, steady-state for the sensor at all plateaus was defined as having been reached when the thermovoltage output was within +/−1 mV of the moving average over twenty sampling points. Due to the thin film metallic elements being deposited near ambient conditions, there is an annealing effect as they are taken to high temperatures for the first time. Once the thermocouple output at 800° C. was stabilized, i.e. annealing is no longer occurring, the temperature was stepped down as shown in FIG. 4. At this point, the result is most indicative of the "seasoned" thermocouple's output and such annealing did not occur on subsequent heating cycles. FIG. 5 shows the correlations between sensor thermocouple output and the temperature reported by the tube furnace via its thermocouple in contact with the outer surface of the quartz tube, from which a third-order polynomial fit with $R^2=0.98$ is found. The equation of this fit is given by $V_{TC}=(-3.23\times10^{-8}$ mV $°$ C.$^{-3})$ $T^3+(1.15\times10^{-4}$ mV $°$ C.$^{-2})$ $T^2+(-2.01\times10^{-2}$ mV $°$ C.$^{-1})$ T, where $V_{TC}$ is the thermocouple voltage and T is temperature in $°$ C.

Figure 6:
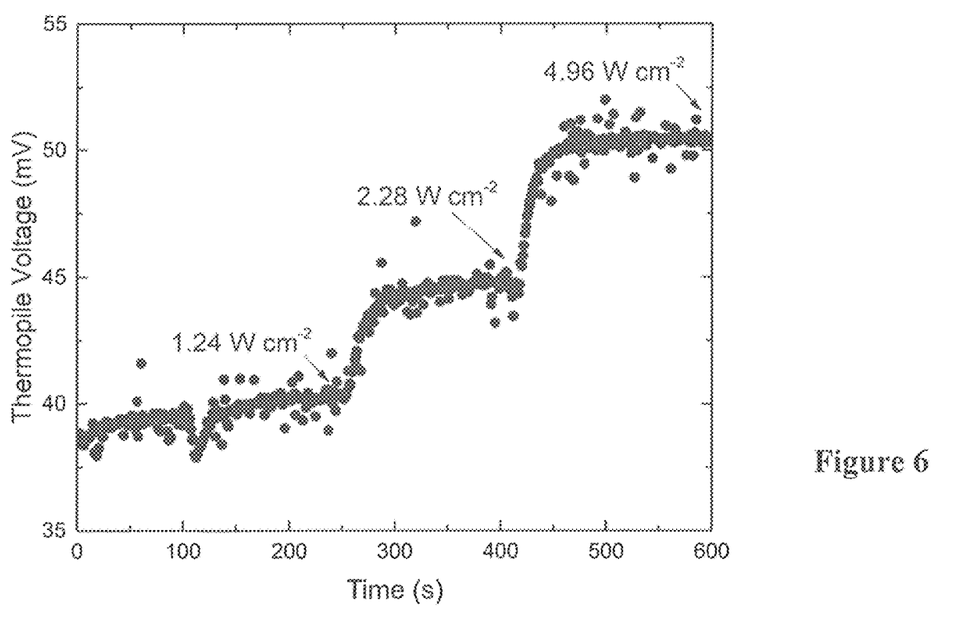
FIG. 6 illustrates thermocouple voltage output from a heat flux increase over time.

Finally, FIG. 6 shows the output from the thermopile at a stage temperature of 800° C. while three different levels of heat flux were applied to the backside of the sensor (1.24 W cm$^{-2}$, 2.28 W cm$^{-2}$, and 4.96 W cm$^{-2}$.). Each change in heat flux resulted in an increase in signal that plateaued when the sensor/stage/furnace system reached steady-state. The relationship between applied heat flux and thermopile output is plotted in FIG. 7, which shows a linear relationship. Indeed, a linear fit with $R^2=0.99$ is found. The equation of this fit is given by $V_{TP}=(2.56$ mV cm$^2$ W$^{-1})$ q"+37.55 mV, where $V_{TP}$ is the thermopile voltage in mV and q" is heat flux in W cm$^2$. It should be noted that under the 1D conduction assumption associated with Equation 1, a linear relationship exists between heat flux and temperature difference $\Delta T$. Thus, a linear relationship between heat flux and thermopile output as shown by the experimental data suggests that the temperature distribution within the sensor is commiserate with 1D conduction and Equation 1 is applicable. From the obtained data, the sensor's thermopile sensitivity is equivalent to the slope of the linear fit, i.e. 2.56 mV cm$^2$ W$^{-1}$. The heat flux sensor's response time for these levels of heat flux is estimated to be ~40 s at 800° C. and is expected to be faster at lower temperatures as the thermal conductivity of the substrate increases. Time resolution, i.e. the speed at which the sensor responds to small changes in heat flux, was not determined in this work.

Figure 7:
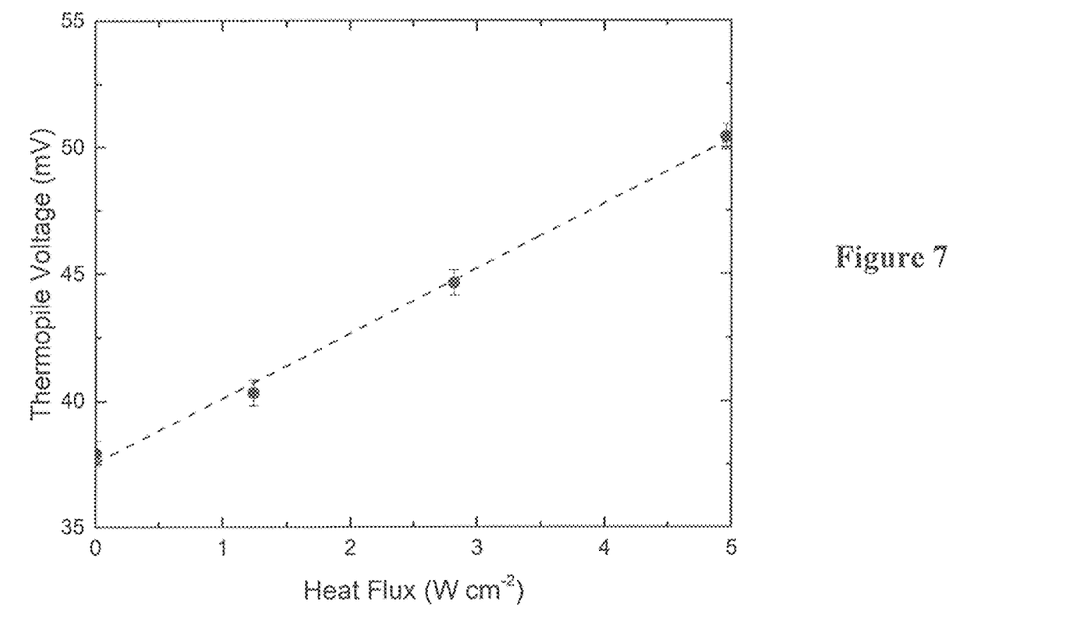
FIG. 7 illustrates thermocouple voltage output from a heat flux increase.

To better interpret the signal obtained from the heat flux-sensing thermopile, an understanding of the temperature distribution within the sensor and especially the difference in temperature $\Delta T$ between the junctions residing within the etch pit and those on the sensor's top surface is required. Specifically, it is advantageous to know the relationship between $\Delta T$, heat flux, and thermopile output to understand if and when the 1D conduction assumption is valid. The experimental data shown in FIG. 7 provides the relationship between heat flux and thermopile output, while a finite element analysis (FEA) thermal conduction model implemented within COMSOL Multiphysics 5.2 was employed to calculate the temperature distribution within the sensor for various experimental conditions. The FEA model replicates the materials and geometry of the tested sensors. For boundary conditions, the same heat flux values utilized in experiments were applied to the backside of the sensor, while on the remaining surfaces a natural convection air environment with convection coefficient h of either 5 W m$^{-2}$ K$^{-1}$ or 10 W m$^{-2}$ K$^{-1}$ (estimated lower and upper bounds, respectively) was applied to replicate the inside of the tube furnace. The temperature-dependent thermal conductivity of the sapphire substrate was varied from 32.5 W m$^{-1}$ K$^{-1}$ at 25° C. to 7.5 W m$^{-1}$ K$^{-1}$ at 800° C. according to literature values. Conduction losses through the long, thin gold wire leads were calculated and found to be less than 1.5% of the total heat input via analytical calculation and were thus not included in the FEA.

Figure 8:
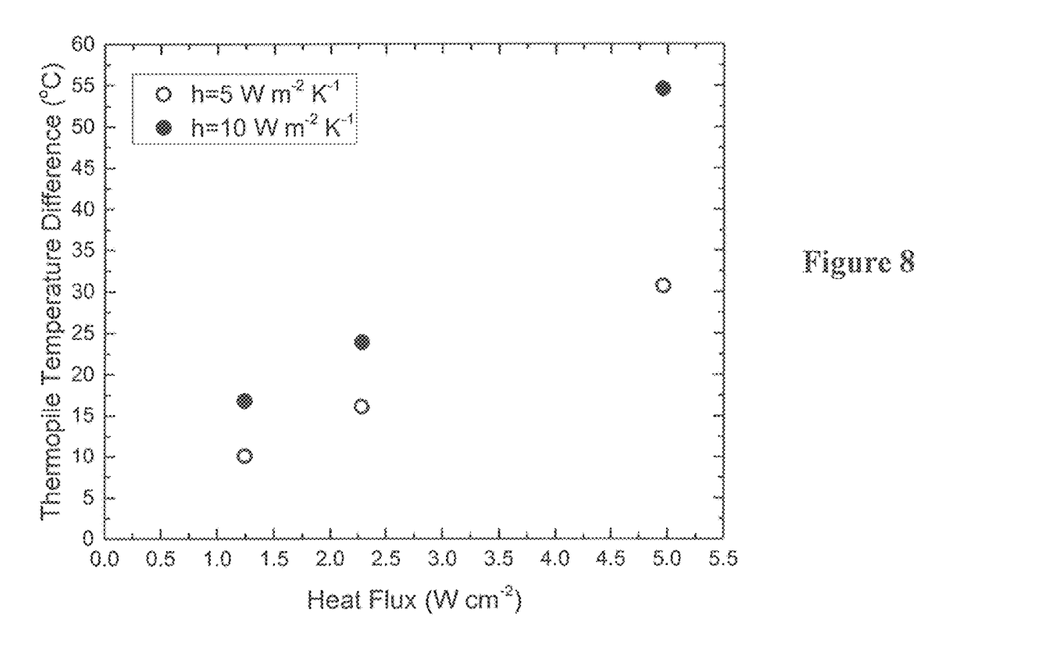
FIG. 8 illustrates temperature difference on different surfaces of the substrate.

For each applied heat flux and convection coefficient condition simulated, the difference in temperature $\Delta T$ between the junctions residing within the etch pit and those on the sensor's top surface were determined from the FEA results, which are summarized in FIG. 8. For the lower bound h=5 W m$^{-2}$ K$^{-1}$ scenario, the obtained relationship between $\Delta T$ and heat flux is approximately linear, which suggests agreement with Equation 1. However, when the convection heat loss is greater as with the upper bound h=10 W m$^{-2}$ K$^{-1}$ scenario, significant non-linearity at higher heat flux results due to the more complex, multidimensional temperature distribution within the sensor. Thus, Equation 1 and its value in leveraging sensor output can be affected by the convective environment in which the sensor is operating. In such cases, FEA modeling may be required to determine appropriate geometric correction factors for such high heat flux/high convection coefficient usage scenarios. Further, the FEA results help shed additional light on the obtained experimental data. The linear relationship between applied heat flux and thermopile output observed in FIG. 7, when combined with the FEA results showing that linearity between applied heat flux and thermopile temperature difference only occurs for relatively low h values, suggests that the h occurring during the experiment must be closer to the lower bound value of h=5 W m$^{-2}$ K$^{-1}$ than the upper bound estimate. Based on this, estimates of the temperature within the etch pit ($T_1$) and the backside temperature ($T_0$) can be made via the 1D approximation as described in Section 2.1. For the three heat flux values tested/simulated, these values are 810.1° C., 816.1° C., and 830.7° C. for $T_1$ and 811.6° C., 818.8° C., and 836.7° C. for $T_0$.

In summary, many embodiments of the present invention provide a multi-functional, batch fabrication-compatible, high temperature thermal sensor capable of measuring both temperature and heat flux normal to its mounting surface. Using an etch pit to achieve thermopile operation is considered one novel for aspect this type of application. Prototype sensors successfully demonstrated continuous operation at 800° C. for over ten hours within an air environment. Basic thermocouple and thermopile sensing was demonstrated at high temperatures, with the temperature distribution within the sensor during various heat flux sensing scenarios determined via FEA. FEA results show that the sensor provides linear relationships between heat flux and thermopile temperature difference at low heat flux and low convection coefficients, but may deviate from this simple behavior under other conditions. Improved operation of the sensor for prolonged exposure beyond 800° C. may be accomplished by sufficiently thick protective oxide cover layer and more effective lead attach methods.

In further applications, this sensor could conceivably be integrated with wireless communication capabilities via which thermocouple and thermopile voltages could be reported remotely. In this way, the sensor could be surface mounted to turbine components or other rotating machinery and provide real-time internal thermal data. Variations of the invention may take the form of optimizing lead attach and protective oxide features so as to maximize high temperature operation. Likewise, alloy-based thermocouple/thermopile elements with proven high-temperature compatibility and superior sensitivity could replace the simple W and Mo features described above (e.g. see H. D. Bhatt, R. Vedula, S. B. Desu, and G. C. Fralick, "Thin Film TiC/TaC Thermocouples," Thin Solid Films, vol. 342, pp. 214-220, 1999 and J. D. Wrbanek, G. C. Fralick, and D. Zhu, "Ceramic Thin Film Thermocouples for SiC-based Ceramic Matrix Composites," *Thin Solid Films*, vol. 520, pp. 5801-5806, 2012, which are incorporated by reference).

The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

The invention claimed is:

1. A thermal sensor comprising:
   (a) a thermopile component comprising:
       (i) an continuous and homogeneous substrate less than 1 mm thick and having a first surface with an area less than 25 mm$^2$, the first surface having a first section and a second section, the second section forming a depression surrounded by the first section at an elevation varying relative to the first section by between about 50 micrometers and about 250 micrometers;
       (ii) a plurality of thermopile junctions, each junction including (1) a first strip of a first conductive material, extending from the first section to the second section, (2) a second strip of a second conductive material, forming an electrical junction with the first strip on the second section and extending to the first section, and (3) wherein the thermopile junctions are connected in series; and
       (iii) a first contact pad on the substrate connected to an initial thermopile junction and a second contact pad on the substrate connected to a last thermopile junction, with conductors connecting to the first and second contact pads and extending off of the substrate;
   (b) a thermocouple component comprising:
       (i) a third strip of a third conductive material connecting with a fourth strip of a fourth conductive material on the first surface of the substrate to form an electrical junction;
       (ii) a third contact pad on the first surface connecting to the third strip and a fourth contact pad on the first surface connecting to the fourth strip;
       (iii) wherein the third and fourth strips do not intersect the first or second strips;
   (c) an anti-oxidation layer applied over the first surface, excepting the contact pads;
   (d) wherein the first, second, third and fourth conductive materials (i) have a thickness of between about 20 and about 500 nm, (ii) a width of between about 20 nm and about 100 um, and (iii) are from the group consisting of Ti, V, Cr, Mn, Zr, Nb, Mo, Tc, Ru, Rh, Hf, Ta, W, Re, Os, Ir, and alloys thereof; and
   (e) wherein the substrate has a melting temperature of at least 1000° C. and a coefficient of thermal expansion (COE) of the substrate is within 30% of the COE of the first and second strips of conductive material.

2. The thermal sensor according to claim 1, wherein the first strip is the same material as the third strip and the second strip is the same material as the fourth strip.

3. The thermal sensor according to claim 1, wherein the thermopile junctions produce an output of at least 5 mV at 700° C.

4. The thermal sensor according to claim 1, wherein the thermopile junctions are positioned around a majority of a circumference of the depression.

5. The thermal sensor according to claim 1, wherein the anti-oxidation layer is one of MgO, SiO2, Al2O3, or another similar electrically insulating material with melting point above that of the intended application.

6. The thermal sensor according to claim 1, wherein the conductors connected to the contact pads are one of Au, Ag, Pt, or alloys thereof or other materials that do not oxidize at high temperatures.

7. The thermal sensor according to claim 6, wherein the conductors are welded to the contact pads.

8. The thermal sensor according to claim 7, wherein the welding is accomplished by at least one of resistance welding, energy beam welding, or solid-state welding.

9. The thermal sensor according to claim 1, wherein the substrate is one of sapphire or silicon carbide.

10. The thermal sensor according to claim 1, wherein the first conductive material and the second conductive material are from the group consisting of Mo, W, and alloys thereof.

11. A method of using a thermopile sensor, wherein the sensor comprises:
(a) a thermopile component comprising:
(i) an uniform substrate less than 1 mm thick and having a first surface with an area less than 25 mm$^2$, the first surface having a first section and a second section, the second section forming a depression surrounded by the first section at an elevation varying relative to the first section by between about 50 micrometers and about 250 micrometers, wherein the elevation variation is formed by removing substrate material from either the first section or second section;
(ii) a plurality of thermopile junctions, each junction including (1) a first strip of a first conductive material, extending from the first section to the second section, (2) a second strip of a second conductive material, forming an electrical junction with the first strip on the second section and extending to the first section, and (3) wherein the thermopile junctions are connected in series; and
(iii) a first contact pad on the substrate connected to an initial thermopile junction and a second contact pad on the substrate connected to a last thermopile junction, with conductors connecting to the first and second contact pads and extending off of the substrate;
(iv) an anti-oxidation layer applied over the first surface, excepting the contact pads;
(v) wherein the first and materials (1) have a thickness of between about 20 and about 500 nm, (2) a width of between about 20 nm and about 100 um, and (3) are from the group consisting of Ti, V, Cr, Mn, Zr, Nb, Mo, Tc, Ru, Rh, Hf, Ta, W, Re, Os, Ir, and alloys thereof;
(vi) wherein the substrate has a melting temperature of at least 1000° C. and a coefficient of thermal expansion (COE) of the substrate is within 30% of the COE of the first and second strips of conductive material; and
(b) wherein the method includes the step of placing the sensor in an operating environment reaching temperatures of over 800° C.

12. The method of claim 11, further forming a thermocouple component on the substrate by the additional steps comprising: (c) forming a third strip of a third conductive material connecting with a fourth strip of a fourth conductive material on the first surface of the substrate to form an electrical junction; (d) forming a third contact pad on the first surface connecting to the third strip and a fourth contact pad on the first surface connecting to the fourth strip, wherein the third and fourth strips do not intersect the first or second strips.

13. A thermal sensor comprising:
(a) a thermopile component comprising:
(i) an uniform substrate having a first surface with a first section and a second section at an elevation varying relative to the first section by between about 10 micrometers and about 250 micrometers;
(ii) a plurality of thermopile junctions, each junction including (1) a first strip of a first conductive material, extending from the first section to the second section, (2) a second strip of a second conductive material, forming an electrical junction with the first strip on the second section and extending to the first section, and (3) wherein the thermopile junctions are connected in series; and
(iii) a first contact pad on the substrate connected to an initial thermopile junction and a second contact pad on the substrate connected to a last thermopile junction, with conductors connecting to the first and second contact pads and extending off of the substrate;
(b) a thermocouple component comprising:
(i) a third strip of a third conductive material connecting with a fourth strip of a fourth conductive material on the first surface of the substrate to form an electrical junction;
(ii) a third contact pad on the first surface connecting to the third strip and a fourth contact pad on the first surface connecting to the fourth strip;
(iii) wherein the third and fourth strips do not intersect the first or second strips.

14. The thermal sensor according to claim 13, wherein the first strip is the same material as the third strip and the second strip is the same material as the fourth strip.

15. The thermal sensor according to claim 13, wherein the first conductive material is from the group consisting of Ti, V, Cr, Mn, Zr, Nb, Mo, Tc, Ru, Rh, Hf, Ta, W, Re, Os, Ir, and alloys thereof.

16. The thermal sensor according to claim 15, wherein the second conductive material is a material different than the first conductive material and is from the group consisting of Ti, V, Cr, Mn, Zr, Nb, Mo, Tc, Ru, Rh, Hf, Ta, W, Re, Os, Ir, and alloys thereof.

17. The thermal sensor according to claim 13, wherein the first and second conductive materials have a melting point of at least 1000° C.

18. The thermal sensor according to claim 13, wherein the thermopile junctions produce an output of at least 5 mV at 700° C.

19. The thermal sensor according to claim 13, wherein the first section of the first surface is a depression extending from the center of the first surface and is surrounded by the second section.

20. The thermal sensor according to claim 13, wherein the substrate has a melting temperature of at least 1000° C. and a coefficient of thermal expansion (COE) of the substrate is within 30% of the COE of the first and second strips of conductive material.

21. The thermal sensor according to claim 19, wherein the thermopile junctions are positioned around a majority of a circumference of the depression.

* * * * *